Figure 1:
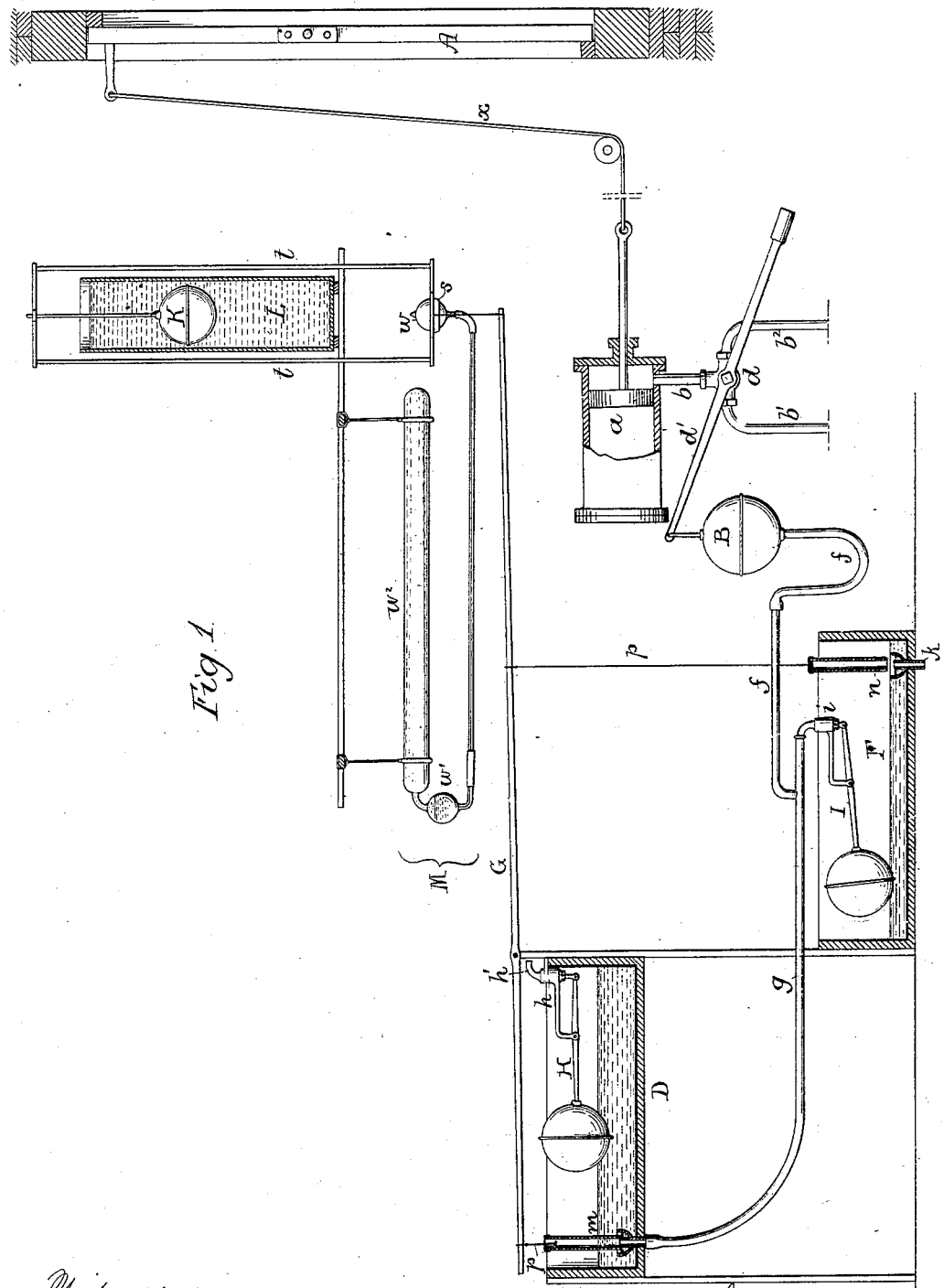

(No Model.) H. B. TATHAM, Jr. 5 Sheets—Sheet 1.
AUTOMATIC REGULATING MECHANISM FOR HEATING AND VENTILATING APPARATUS.

No. 333,790. Patented Jan. 5, 1886.

Witnesses
David Williams
Harry Drury

Inventor.
Henry B. Tatham Jr.
by his Attorneys
Howsen & Sons (No Model.) 5 Sheets—Sheet 2.
H. B. TATHAM, Jr.
AUTOMATIC REGULATING MECHANISM FOR HEATING AND VENTILATING APPARATUS.
No. 333,790. Patented Jan. 5, 1886.
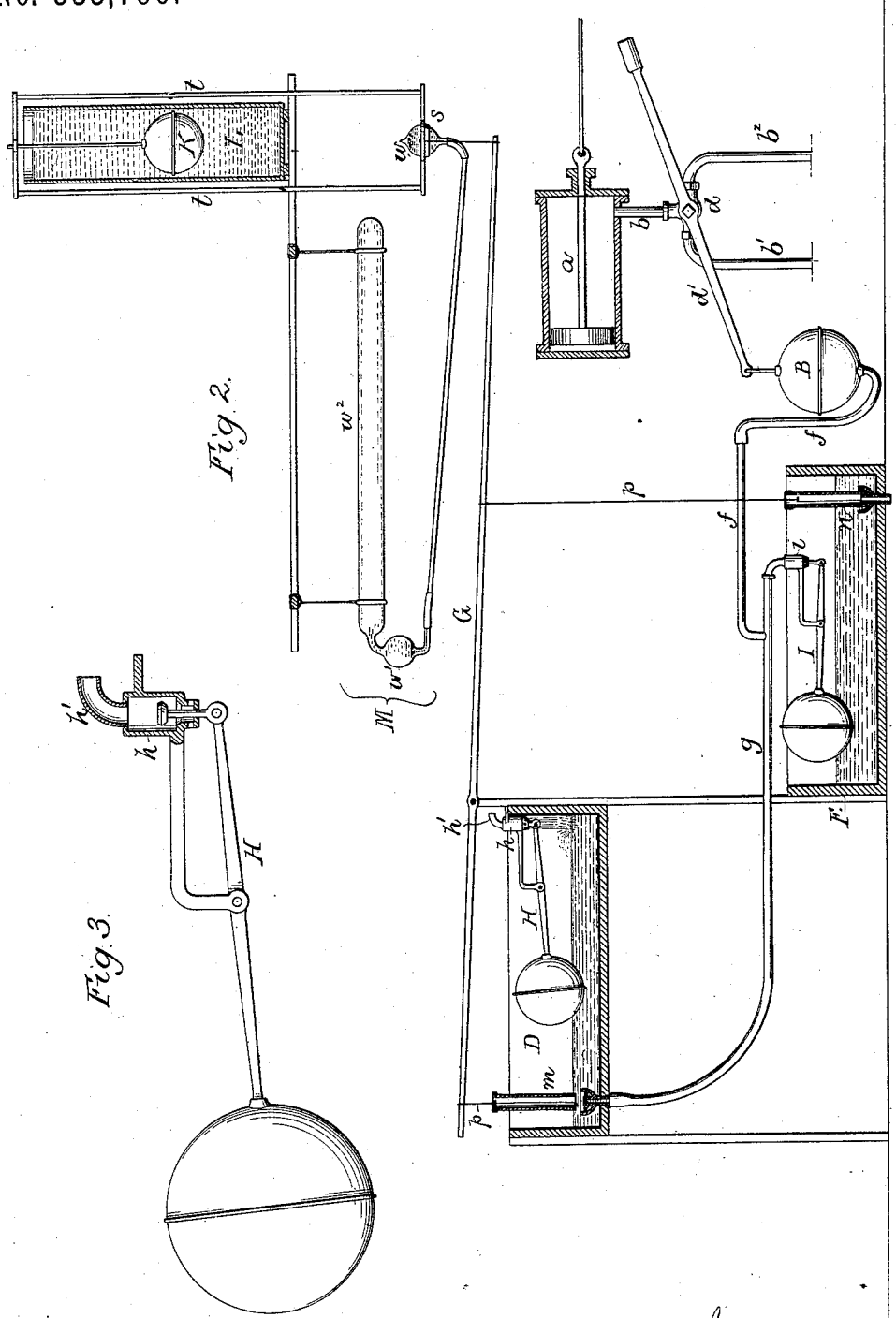

(No Model.) 5 Sheets—Sheet 3.
H. B. TATHAM, Jr.
AUTOMATIC REGULATING MECHANISM FOR HEATING AND VENTILATING APPARATUS.
No. 333,790. Patented Jan. 5, 1886.
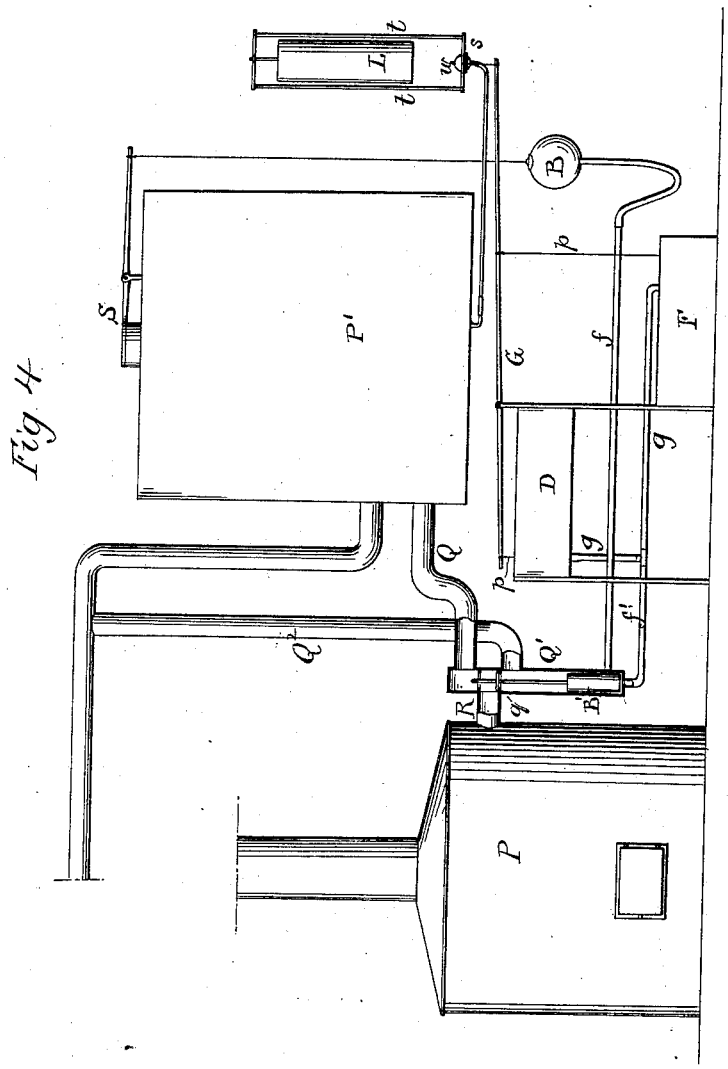

(No Model.)
H. B. TATHAM, Jr.
5 Sheets—Sheet 4.
AUTOMATIC REGULATING MECHANISM FOR HEATING AND VENTILATING APPARATUS.
No. 333,790. Patented Jan. 5, 1886.
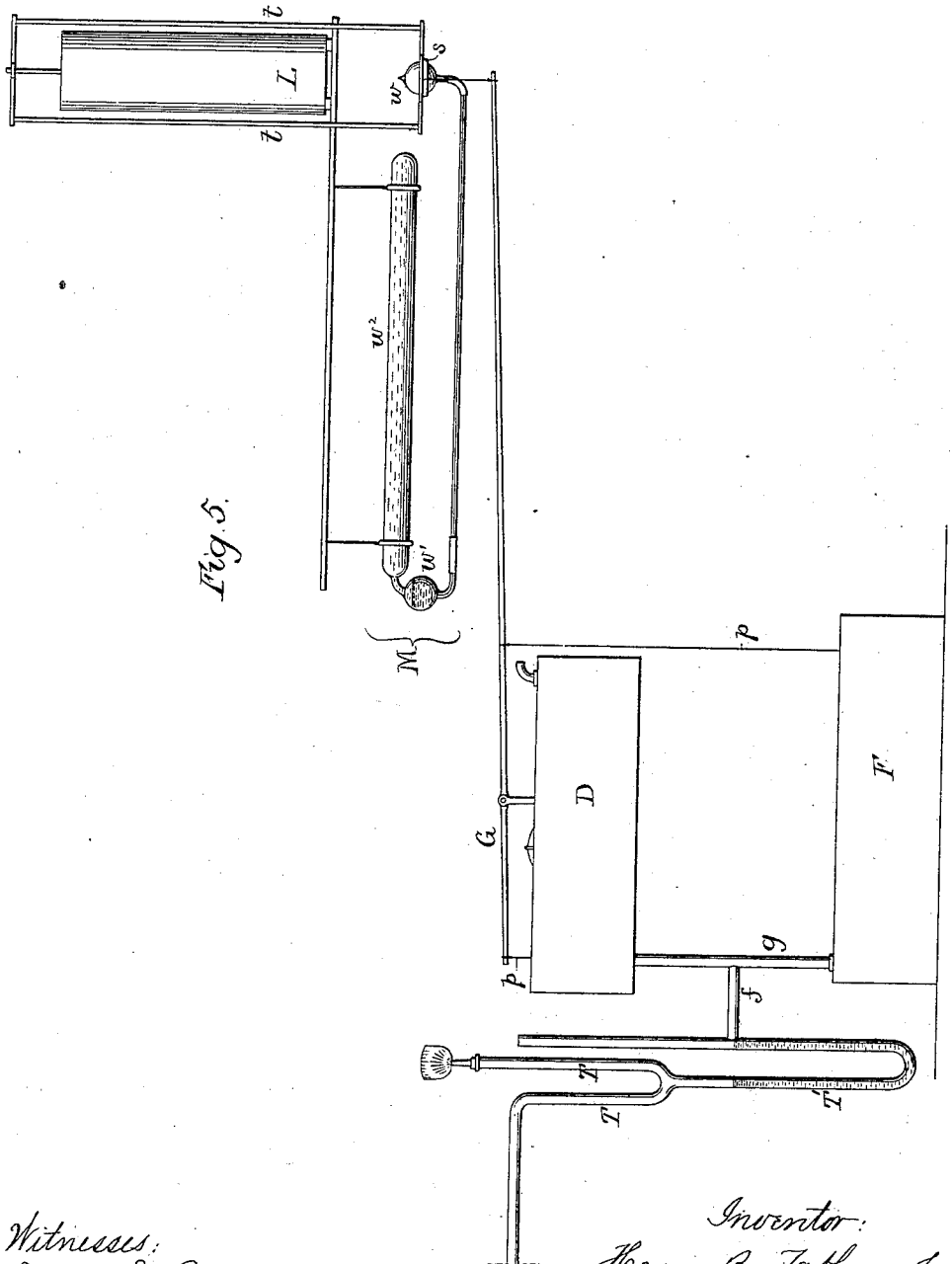

(No Model.)  5 Sheets—Sheet 5.
H. B. TATHAM, Jr.
AUTOMATIC REGULATING MECHANISM FOR HEATING AND VENTILATING APPARATUS.
No. 333,790.  Patented Jan. 5, 1886.
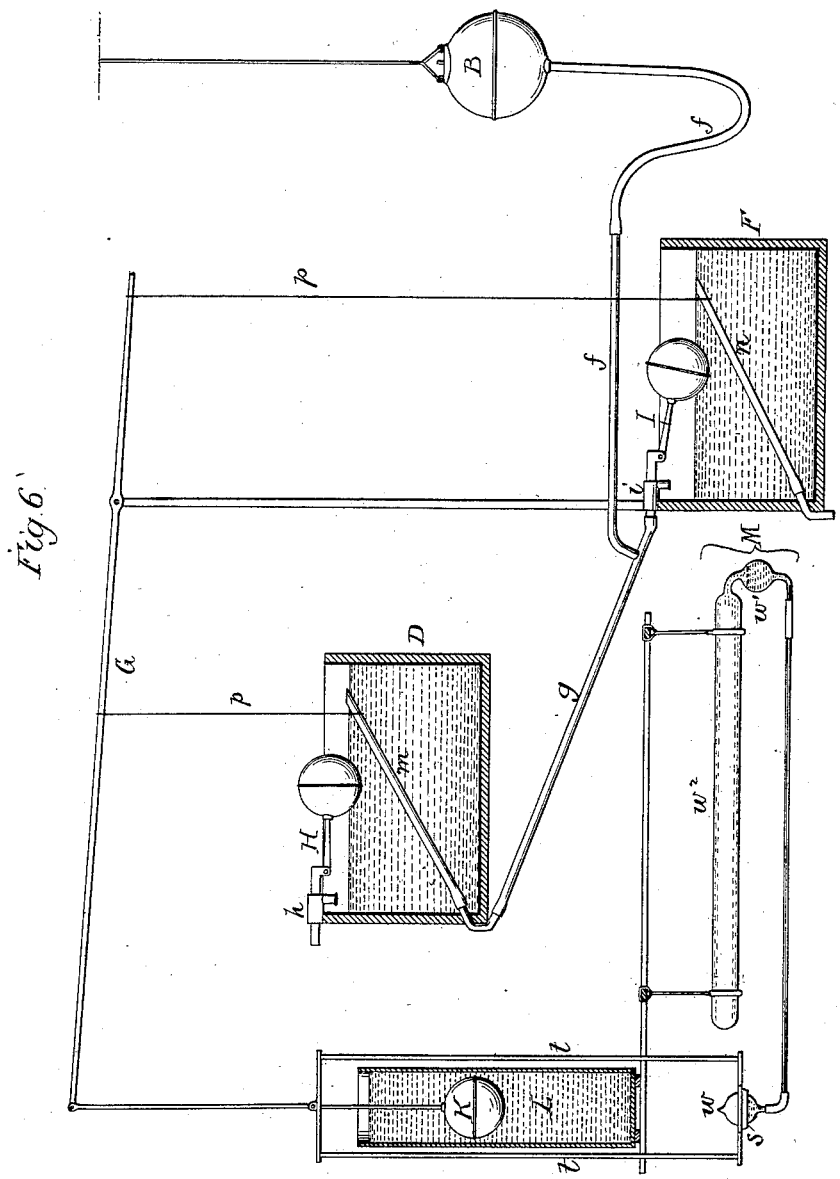

UNITED STATES PATENT OFFICE.

HENRY B. TATHAM, JR., OF PHILADELPHIA, PENNSYLVANIA.

AUTOMATIC REGULATING MECHANISM FOR HEATING AND VENTILATING APPARATUS.

SPECIFICATION forming part of Letters Patent No. 333,790, dated January 5, 1886.

Application filed July 23, 1883. Serial No. 101,638. (No model.)

*To all whom it may concern:*

Be it known that I, HENRY B. TATHAM, Jr., a citizen of the United States, and a resident of Philadelphia, Pennsylvania, have invented certain Improvements in Automatic Regulating Mechanism for Heating and Ventilating Apparatus, of which the following is a specification.

The object of my invention is to provide mechanism whereby the heating or ventilation of rooms or apartments may be automatically regulated, and this object I attain in the manner which I will now proceed to describe, reference being had to the accompanying drawings, in which—

Figure 1 is a side view, partly in section, of apparatus embodying my invention; Fig. 2, the same, with some of the parts in a different position; Fig. 3, a view on a larger scale of one of the valves of the apparatus, and Figs. 4 to 6, inclusive, views of other forms of apparatus embodying the invention.

My invention consists of certain construction of apparatus, whereby water or other liquid is used to operate a valve or damper in the heating or ventilating apparatus of a room or apartment, the flow of the liquid being regulated by valves under control of a thermostat in said room or apartment.

In the apparatus shown in Figs. 1 and 2 A represents a pivoted window-sash or ventilator connected by a cord, $x$, to the rod of a piston adapted to a cylinder, $a$, with which, in front of the piston, communicates a pipe, $b$, the latter having a three-way valve, $d$, whereby communication may be established between the cylinder $a$ and a pipe, $b'$, communicating with a supply of water or other liquid under pressure, or between the cylinder and a waste-pipe, $b^2$, so that when the communication is established between the cylinder and pipe $b'$ the piston will be driven inward and the window or ventilator opened, said window closing by its own weight when the water is allowed to escape from the cylinder $a$ by opening communication between the same and the pipe $b^2$.

The operation of the valve $d$ is effected in the following manner: On the stem of the valve is a lever, $d'$, one arm of which is weighted, while from the other arm is suspended a vessel, B, in the present instance in the form of a hollow sphere, this vessel being connected by a tube, $f$, partly flexible, with a pipe, $g$, forming a communication between two tanks, D and F. Water can enter the tank D from a supply-pipe, $h'$, through a valve, $h$, Fig. 3, controlled by a float-lever, H, and the tank F has a similar float-lever, I, adapted to actuate a like valve, $i$, whereby the flow of water from the pipe $g$ into the tank F is permitted or prevented. The flow of water from the tank D into the pipe $g$ is governed by a valve, $m$, consisting simply of a tube adapted to dip into a cup of mercury surrounding the mouth of the pipe, and the exit-pipe $k$ of the tank F has a similar valve, $n$. These valves $m$ and $n$ are connected by rods $p$ to the opposite arms of a lever, G, so that as the latter is vibrated one of the valves will be closed and the other opened, the rods $p$ being so connected to the valves as to be free to move independently of the valves after the latter have been closed, so that a slight lead of the closing valve over the opening valve is permitted. To one arm of the lever G is also connected a ring, $s$, carrying a bulb, $w$, flexibly connected to the bulb $w'$ of the alcohol-tube $w^2$ of a thermostat, M, said ring being also connected by a light frame, $t$, to a float, K, contained in a vessel, L, of water or other liquid above the bulb $w$. The buoyancy of the float K is such that when the room or apartment in which the thermostat M is situated is at the desired temperature the weight of the mercury in the bulb $w$ is not sufficient to overcome this buoyancy; hence the bulb occupies the elevated position shown in Fig. 1, the valve $m$ is closed, the valves $n$ and $i$ open, the vessel B elevated, and the valve $d$ adjusted so as to open communication between the cylinder $a$ and waste-pipe $b^2$, the window A being closed, as shown in Fig. 1. As soon, however, as the temperature of the room or apartment exceeds the desired limit, the weight of mercury which has been forced into the bulb $w$ is such as to overcome the buoyancy of the float K, and said bulb falls, thus causing the vibration of the lever G, the closing of the valve $n$, and the opening of the valve $m$. The valve $i$ being open, water flows from the tank D into the tank F through the pipe $g$ until the valve $i$ in said pipe is closed by the operation of the float-lever I, when the water is directed through the flexible pipe $f$ into the vessel B. The weight of the water admitted to said vessel B causes it to fall, thus operating the lever $d'$ of the valve $d$, and opening communication between the cylinder $a$ and the pipe $b'$, as shown in Fig. 2. Water under pressure is thus admitted into the cylinder, the piston is driven inward, and the window A is opened and remains open until the temperature again falls to the desired point, and the bulb $w$ is raised by the float K, so as to vibrate the lever G, close the valve $m$, and open the valve $n$. As the water escapes from the tank F, the valve $i$ is opened by the float-lever I, and the water is thus permitted to escape from the vessel B, so that the weighted lever $d'$ adjusts the valve $d$ to its former position, the window A closing as the water escapes from the cylinder $a$. The proper level of water in the tank D is preserved by the operation of the float-lever H, a fresh supply of water entering said tank as soon as the level falls sufficiently to cause the opening of the valve $h$.

Although I have shown the device as applied to the opening of a window or ventilator, it may be used as well for operating a valve or damper in a pipe for supplying hot air, for controlling the draft of a furnace, for operating a valve in the supply-pipe of a gas-heater, or for raising and lowering the wick of a lamp used for heating purposes; or the device may be connected both to a damper for regulating the supply of heated air and to a window or ventilator. The construction of the device may also be modified in various ways within the scope of my invention. For instance, instead of operating a valve in a pipe for directing water to a cylinder, the vessel B itself may be connected to the governing damper or valve which is to be operated, so that the rise and fall of the vessel may be transmitted directly to said damper or valve; and instead of admitting water to and exhausting it from a vessel, so as to cause the operation of the latter by the weight of the water, a float may be used, the said float rising and falling with the level of the water in the vessel containing the same.

In Fig. 4 I have shown an apparatus embodying both of these plans. P represents a stove or furnace of any suitable construction, and P' an incubator, which is heated by a pipe, Q, the latter being a branch from a pipe, Q', communicating with a pipe, R, which may be either the smoke-pipe of the furnace or a hot-air pipe leading therefrom. This pipe Q' has another branch, Q², and between the branches Q and Q² is a valve, $q$, connected to a float, B', which occupies the closed lower portion of the pipe Q'. The incubator has a thermostat and regulating apparatus similar to those described and shown in Figs. 1 and 2, except that the vessel B is connected directly to the lever of a damper, S, on the incubator, instead of to the governing-valve of a pressure-cylinder, and the pipe $g$ communicates with the vessel B through the pipe Q' and tubes $f'$ $f$, so that the water from the pipe $g$ is directed to the said pipe Q' and to the vessel B, whereby there is a joint operation of the valve $q$ and damper S, and a consequent cutting off of the heat and simultaneous opening of the ventilator of the incubator.

In controlling the flow of gas to a burner for heating purposes I prefer to utilize the water itself as a valve, as shown in Fig. 5. In this case the gas passes to the burner through a U-shaped pipe, T, so that the flow of gas is cut off when the water rises above the bend of the pipe, but is unobstructed when the water-level falls below the bend. Below the bent pipe T is a U-shaped pipe, T', with which communicates a branch, $f$, from the pipe $g$. Water permitted to flow through the pipes $g$ $f$ rises in the pipe T to the level of the water in the tank D, and thus cuts off the flow of gas through said pipe T; but when the water is discharged from the pipe $g$ the level in the pipes T T' falls to the mouth of the branch $f$, and the flow of gas through the pipe T is resumed, the water remaining in the bent pipe T', however, and serving as a trap to prevent the backward flow of gas into the pipe $g$.

Although I have shown two independent valves for controlling the flow of water to and from the regulating apparatus, a duplex valve, such as shown in another application for Letters Patent filed by me herewith, Serial No. 101,639, or a three-way valve under control of the thermostat, may be used in place of the same; or valves may be dispensed with and a system of movable pipes, $m$ and $n$, such as shown in Fig. 6, may be used in their stead, these pipes being connected to the lever G, and the flow of water through the same being governed by raising their open mouths above or dipping them below the level of the water in the tanks D and F, the operation of the apparatus in other respects being similar to that shown in Figs. 1 and 2.

I claim as my invention—

1. The combination of a liquid-receiver forming part of a device for operating a valve or damper, an elevated liquid-reservoir, a pipe, $g$, communicating with said reservoir and with the liquid-receiver of the damper-operating device, valves whereby the liquid is caused to flow from the elevated reservoir to the receiver or is discharged from the latter, and a thermostat for operating said valves, all substantially as specified.

2. The combination of a liquid-receiver forming part of a damper-operating device, two tanks, D and F, located one above the other, a pipe, $g$, whereby a flow of liquid from the upper to the lower tank is permitted, a branch, $f$, communicating with said pipe and with the receiver of the damper-actuating device, valves for controlling the flow of liquid through the pipe $g$, and a thermostat for operating said valves, all substantially as set forth.

3. The combination of a damper-actuating device, a vessel, B, suspended therefrom, an elevated liquid-reservoir, a pipe, $g$, communicating therewith and having a flexible connection with the vessel B, valves controlling the flow of liquid through said pipe, and a thermostat for operating said valves, all substantially as specified.

4. The combination of the damper, the cylinder $a$, having a piston the rod of which is connected to said damper, supply and discharge pipes for said cylinder, a three-way valve, $d$, having an arm, $d'$, a vessel, B, suspended from said arm, an elevated liquid-reservoir having a discharge-pipe, $g$, a flexible connection between said pipe and the vessel, valves for controlling the flow of liquid through said pipe, and a thermostat for operating said valves, all substantially as specified.

5. The combination of a liquid-receiver forming part of a damper-operating device, two tanks, D and F, located one above the other, a pipe, $g$, forming a communication between said tanks, a valve, $m$, governing the inlet to said pipe, a valve governing the outlet from said pipe and having a float-lever, I, a valve, $n$, governing the discharge from the tank F, a thermostat for operating said valves $m$ and $n$, and a branch, $f$, communicating with the pipe $g$ and with the liquid-receiver of the damper-actuating device, as specified.

6. The combination, with the vessel $w^2$, of a thermostat, the vessel L, the submerged float K, a frame, $t$, connected to said float, and a bulb, $w$, carried by said frame and having a flexible connection with the vessel $w^2$, as set forth.

In testimony whereof I have signed my name to this specification in the presence of two subscribing witnesses.

H. B. TATHAM, JR.

Witnesses:
HARRY DRURY,
HARRY SMITH.